(12) United States Patent
Zhou et al.

(10) Patent No.: US 10,948,569 B2
(45) Date of Patent: Mar. 16, 2021

(54) MISALIGNMENT DETECTION FOR A VEHICLE RADAR SENSOR

(71) Applicants: AUTOLIV DEVELOPMENT AB, Vårgårda (SE); Yi Zhou, Grobenzell (DE); Christopher Unverdorben, Munich (DE); Michael Maas, Munich (DE)

(72) Inventors: Yi Zhou, Grobenzell (DE); Christopher Unverdorben, Munich (DE); Michael Maas, Munich (DE)

(73) Assignee: VEONEER SWEDEN AB, Vargarda (SE)

( * ) Notice: Subject to any disclaimer, the term of this patent is extended or adjusted under 35 U.S.C. 154(b) by 250 days.

(21) Appl. No.: 16/096,773

(22) PCT Filed: Apr. 27, 2017

(86) PCT No.: PCT/EP2017/060101
§ 371 (c)(1),
(2) Date: Oct. 26, 2018

(87) PCT Pub. No.: WO2017/186868
PCT Pub. Date: Nov. 2, 2017

(65) Prior Publication Data
US 2020/0326411 A1     Oct. 15, 2020

(30) Foreign Application Priority Data
Apr. 29, 2016   (EP) ..................................... 16167615

(51) Int. Cl.
*G01S 13/52*     (2006.01)
*G01S 7/40*      (2006.01)
(Continued)

(52) U.S. Cl.
CPC ............ *G01S 7/4026* (2013.01); *G01S 7/415* (2013.01); *G01S 13/52* (2013.01); *G01S 13/931* (2013.01);
(Continued)

(58) Field of Classification Search
CPC ........ G01S 7/4026; G01S 7/415; G01S 13/52; G01S 13/931; G01S 2013/93271; G01S 2007/403
See application file for complete search history.

(56) References Cited

U.S. PATENT DOCUMENTS 7,304,602 B2   12/2007   Shinagawa et al.
7,443,335 B2   10/2008   Kai et al.
(Continued)

FOREIGN PATENT DOCUMENTS

EP    1 612 577 A1    1/2006

OTHER PUBLICATIONS

International Search Report and Written Opinion of the International Searching Authority of PCT/EP2017/060101 dated Jul. 7, 2017.

*Primary Examiner* — Timothy A Brainard
(74) *Attorney, Agent, or Firm* — Dickinson Wright PLLC

(57) ABSTRACT

A vehicle radar system (2) that is arranged to detect a plurality of objects outside a vehicle (1) and that includes a radar detector (3) and a processing unit arrangement (4). The processing unit arrangement (4) is arranged to obtain at least one total detection angle ($\varphi_{dT}, \varphi_{dT}'$) relative an x-axis (7) and at least one corresponding detected target Doppler velocity ($v_{Doppler}$) relative the radar detector (3) for each detected object (5, 6; 10, 11). Each detected object is classified as moving or stationary, and a relation is determined between the stationary detections and the total number of detections. The processing unit arrangement (4) further is adapted to (Continued)

determine whether the radar detector (3) is misaligned based on the relation, where the total detection angle ($\varphi_{dT}$, $\varphi_{dT}'$) equals the sum of a known mounting angle ($\varphi_m$) between the x-axis (7) and the radar detector's mounting direction (8), and a detection angle ($\varphi_d$, $\varphi_d'$). The present disclosure also relates to a corresponding method.

15 Claims, 3 Drawing Sheets

(51) Int. Cl.
  *G01S 7/41* (2006.01)
  *G01S 13/931* (2020.01)
(52) U.S. Cl.
  CPC ............ *G01S 2007/403* (2013.01); *G01S 2013/93271* (2020.01)

(56) References Cited

U.S. PATENT DOCUMENTS

| | | |
|---|---|---|
| 8,930,063 B2 | 1/2015 | Gandhi et al. |
| 2018/0203107 A1* | 7/2018 | Asanuma ............... G01S 13/343 |
| 2018/0203109 A1* | 7/2018 | Aoki ..................... G01S 13/726 |

* cited by examiner

MISALIGNMENT DETECTION FOR A VEHICLE RADAR SENSOR

CROSS-REFERENCE TO RELATED APPLICATIONS

This application is a 35 U.S.C. § 371 national phase application of PCT International Application No. PCT/EP2017/060101, filed Apr. 27, 2017, which claims the benefit of priority under 35 U.S.C. § 119 to European Patent Application No. 16167615.0, filed Apr. 29, 2016, the contents of which are incorporated herein by reference in their entirety.

FIELD OF THE INVENTION

The present disclosure relates to a vehicle radar system that is arranged to detect objects outside a vehicle and that includes a radar detector and a processing unit. The processing unit is arranged to obtain values for detected target angle and detected target Doppler velocity relative the radar detector for each detected object during a certain time interval.

The present invention also relates to a method for estimating a vehicle radar system misalignment, the vehicle radar system being used for detecting objects outside a vehicle. The method includes the step of detecting target angle and target Doppler velocity for each detected object during a certain time interval.

BACKGROUND

Today, a radar device may be mounted on a motor vehicle in order to detect reflections from objects in order to implement functions such as speed control and collision prevention, as well as others. In such a radar device it is required to obtain an azimuth angle in the form of a target bearing angle, a distance with respect to the object and a relative speed between the vehicle and the object.

For most vehicle radar applications it is important to measure the target bearing angle with very high precision. The angle accuracy of a radar system depends on fundamental parameters like modulation technique, component tolerances, assembly precision or installation conditions. Furthermore, due to various environmental influences such as mechanical stress or bad weather, the angle estimation performance might suffer additionally. Some of those error sources show a random statistical distribution while others lead to a fixed angle offset. This fixed offset is the so called misalignment angle. Monitoring the misalignment angle is often an essential requirement in vehicle applications.

For small misalignment angles the sensor software is able to detect its new rotated position and correct the measured detections appropriately.

U.S. Pat. No. 7,443,335 discloses angle error estimation where detections that seem to relate to stationary objects are analyzed.

U.S. Pat. No. 8,930,063 discloses analyzing detections of an object while it is in a radar field of view.

For larger misalignment angles, for example due to that the radar sensor loses its original mounting angle when it drops out of its mounting bracket after e.g. a crash or other reasons, state of the art software correction does not work anymore. Such a misalignment should be detected as soon as possible to avoid false positive alarm or any false actions such as automatic braking and/or steering.

There is thus a need for a device and a method for vehicle radar angle error detection that is quick, reliable and uncomplicated.

SUMMARY

The above-referenced object is addressed in accordance with the present invention by a vehicle radar system that is arranged to detect a plurality of objects outside a vehicle and includes a radar detector and a processing unit arrangement. The processing unit arrangement is arranged to obtain at least one total detection angle relative an x-axis and at least one corresponding detected target Doppler velocity relative the radar detector for each detected object during a certain time interval. The processing unit arrangement is adapted to classify each detected object as moving or stationary relative the surrounding environment, and to determine a relation between the number of detections that has been classified as stationary and the total number of detections. The processing unit arrangement is further adapted to determine whether the radar detector is misaligned based on the previously mentioned relation. The total detection angle equals the sum of a known mounting angle between the x-axis and the radar detectors mounting direction, and a detection angle.

The above-referenced object is also addressed in accordance with the present invention by a method for estimating misalignment of a vehicle radar detector in a vehicle radar system that is used for detecting a plurality of objects outside a vehicle. The method includes:

Obtaining at least one total detection angle relative an x-axis and at least one corresponding detected target Doppler velocity relative the radar detector for each detected object during a certain time interval.

Classifying each detected object as moving or stationary relative the surrounding environment.

Determining a relation between the number of detections that has been classified as stationary and the total number of detections. Determining whether the radar detector is misaligned based on the relation.

The total detection angle equals the sum of a known mounting angle between the x-axis and the radar detector's mounting direction, and a detection angle.

According to an example embodiment of the present invention, the processing unit arrangement is adapted to calculate a percentage fraction by dividing the number of detections that has been classified as stationary with the total number of detections. The processing unit arrangement is further adapted to compare the percentage fraction with a threshold value, and to determine that the radar detector is misaligned when the percentage fraction falls below the threshold value.

According to another example embodiment of the present invention, the processing unit arrangement is adapted to classify detected objects as moving or stationary objects relative the surrounding environment by determining if the detected target Doppler velocity equals a calculated radial velocity, and if that is the case to classify a detected object as stationary. The processing unit arrangement is adapted to calculate the calculated radial velocity as cosine for the total detection angle times a negative host vehicle velocity.

According to another example embodiment of the present invention, the processing unit arrangement is adapted to classify detected objects as moving or stationary objects relative the surrounding environment by determining whether the detected target Doppler velocity equals zero for a total detection angle that equals 90°, and if that is the case to classify a detected object as stationary.

According to another example embodiment of the present invention, the processing unit arrangement is adapted to only consider detections having a total detection angle that have an absolute value that exceeds a predetermined angular cut value.

Other example embodiments are disclosed in the following description.

A number of advantages are obtained by implementation of the present disclosure. For example, a device and a method for vehicle radar angle error estimation which is quick, reliable and uncomplicated are provided.

BRIEF DESCRIPTION OF THE DRAWINGS

The present disclosure will now be described more in detail with reference to the appended drawings, where.

DETAILED DESCRIPTION

Figure 1:
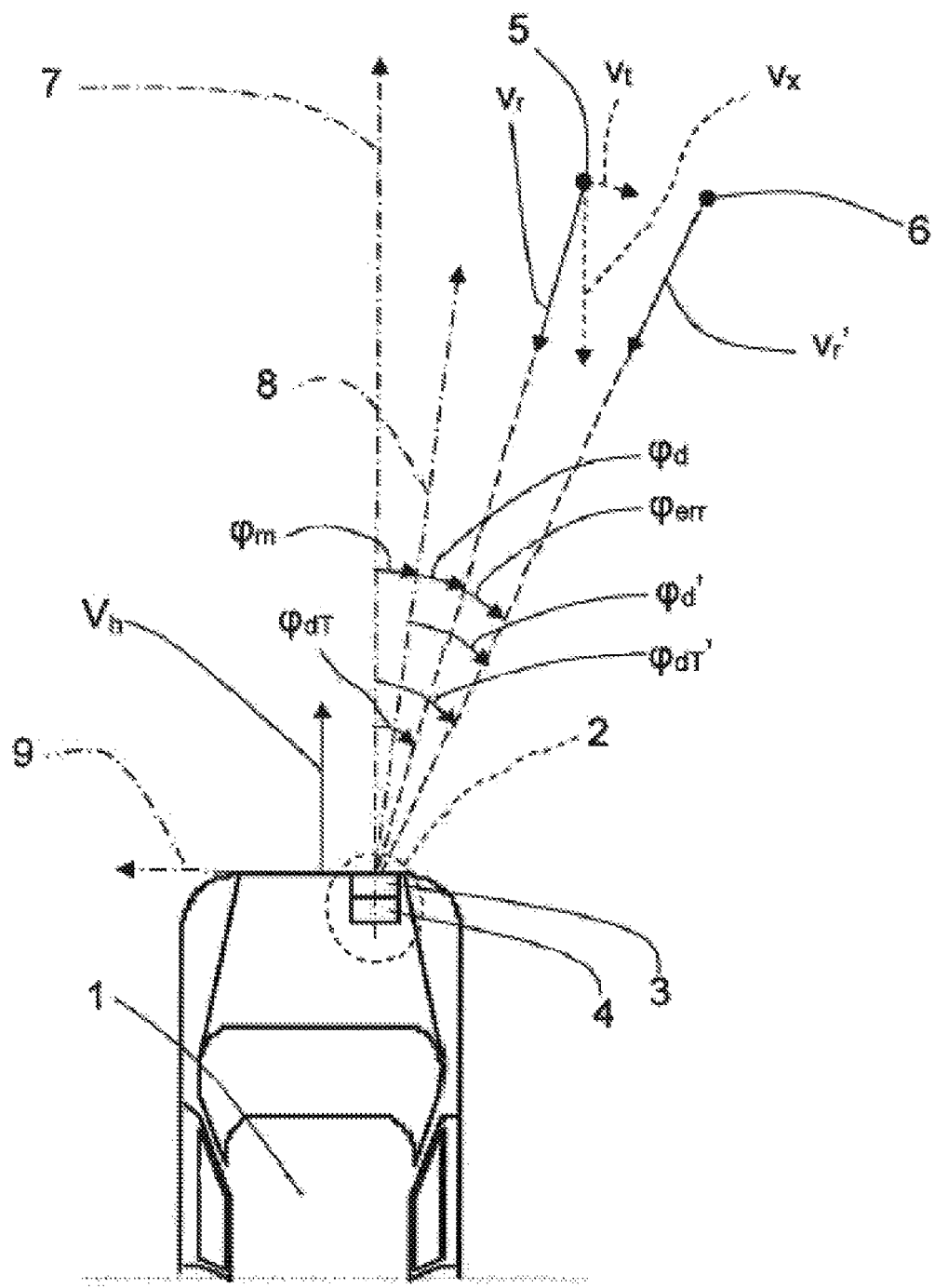
FIG. 1 shows a schematic top view of a vehicle with a radar system according to a first example embodiment.

With reference to FIG. 1, showing a first example embodiment, a host vehicle 1 includes a radar system 2, which in turn includes a radar detector 3 and a processing unit 4. The host vehicle 1 is moving with a certain host vehicle velocity $v_h$ and there is an object 5 present in the vicinity of the vehicle's path, where the object 5 is detected by the radar detector 3. The radar detector is mounted such that a mounting angle $\varphi_m$ is presented for the radar detector's forward detection direction 8 with respect to an x-axis 7 that extends from the vehicle 1 in its forward running direction, here shown extending in the same direction as the vehicle's velocity $v_h$. The mounting angle $\varphi_m$ is a known parameter, and is stored into the radar system 2. There is also a perpendicularly extending y-axis 9. The detected real object 5 has a correct detection angle (pa with respect to the radar detector's forward detection direction 8.

The detected object 5 has a detected correct Doppler velocity $v_{Doppler}$, where a velocity x-component $v_x$ of the target 5 extends in the direction of the x-axis 7, and where a tangential velocity component $v_t$ of the target 5 extends in a tangential direction. The velocity x-component $v_x$ is calculated in the host vehicle's reference system as: $v_x = v_{Doppler}/\cos$.

$$v_x = v_{Doppler}/\cos(\varphi_d + \varphi_m) \quad (1)$$

If the object 5 is a stationary object, the velocity x-component $v_x$ is directly connected to the velocity $v_h$ of the host vehicle 1 according to:

$$v_x = -v_h \quad (2)$$

The velocity x-component $v_x$ of stationary detections may thus either be acquired directly from the measured Doppler velocity $v_{Doppler}$, or calculated using the negative host vehicle velocity $v_h$ together with the mounting angle $\varphi_m$ and the correct detection angle cpd.

Generally, this means that if equation (2) is true within a certain uncertainty of several percent, the corresponding detection can be classified as stationary.

The determined velocity x-component $v_x$ of the target 5 is directly dependent on the mounting angle $\varphi_m$, and equation (1) and (2) may combined as:

$$v_r = -v_h \cdot \cos(\varphi_d + \varphi_m) = v_{Doppler} \quad (3),$$

where $v_r$ is a calculated radial velocity using the host velocity $v_h$ together with the mounting angle $\varphi_m$ and the correct detection angle $\varphi_d$, and $v_{Doppler}$ is the measured Doppler velocity. By means of equation (3), the calculated radial velocity $v_r$ may be derived, and should equal the measured Doppler velocity $v_{Doppler}$.

If equation (3) is true within a certain uncertainty of several percent when comparing the calculated radial velocity $v_r$ with the measured Doppler velocity $v_{Doppler}$, the corresponding detection can be classified as stationary. Since in general most detections relate to stationary objects, a majority of all detections should be classified as stationary.

However, if there is a misalignment error, there is a detected false object 6 that differs from the real object 5. As illustrated in FIG. 1 there is a misalignment error angle $\varphi_{err}$, such that the detected false object 6 has a misaligned detection angle $\varphi_d'$ with respect to the radar detector's forward detection direction 8, where the misaligned detection angle $\varphi_d'$ equals the sum of the correct detection angle $\varphi_d$, constituting a true target angle, and the misalignment error angle $\varphi_{err}$ according to:

$$\varphi_d' = \varphi_d + \varphi_{err} \quad (4).$$

When there is no misalignment, the misaligned detection angle $\varphi_d'$ equals the correct detection angle $\varphi_d$.

However, when there is misalignment, Equation (3) becomes:

$$v_r' = -v_h \cdot \cos(\varphi_d' + \varphi_m) \quad (5)$$

where $v_r'$ is the calculated misaligned radial velocity which will not equal the measured Doppler velocity $v_{Doppler}$, i.e. $v_r' \neq v_{Doppler}$.

This will result in that most of the real stationary objects will be classified as moving objects, while only a very small fraction of the moving targets will be misclassified as stationary.

Since, as mentioned above, there generally are more stationary detections than moving detections in the real world, an aligned sensor can according to the present disclosure be distinguished from a misaligned sensor by calculating a percentage fraction by dividing the number of detections that has been classified as stationary with the total number of detections.

Without any misalignment, this percentage fraction is expected to be relatively high, while when there is a certain misalignment, it will be relatively low, implying that the radar system 2 is not able to classify stationary detections as such anymore. It can thus be determined that a radar detector 3 is misaligned when the percentage fraction falls below a certain threshold value. A misalignment status is thus monitored by a comparison with a predefined threshold value. If such a comparison results in that a sensor is found to be misaligned critical functions, such as automatic safety functions, should be deactivated and an error message should be sent to the driver.

In order to increase the robustness, this comparison should according to some aspects be based on accumulated results of a certain number of radar cycles, for example several thousands of radar cycles. In this context, a radar cycle is one observation phase in which the radar acquires data, processes the date on several signal processing levels and sends out available results. This can be a fixed time interval, for example 20-80 milliseconds, or it can be a dynamic time interval depending on environment conditions and processing load.

The percentage fraction will not show the same behavior in different environments since it e.g. is dependent on the host velocity $v_h$. Thus, according to some aspects, the comparison with the threshold is performed for different environment situations like host velocity windows in order to increase the robustness.

According to some aspects, if a percentage fraction is found to be smaller than the threshold, possibly after a certain number of cycles, "1" is added to an introduced counter C, i.e. "C+1". If the sensor is found to be aligned and the counter is C>0, then "1" is subtracted. If this counter C is larger than a fixed value (e.g. C=100), the sensor is expected to be totally misaligned.

With a misaligned sensor there are still some real stationary targets which can nonetheless be classified as stationary, which is undesirable. A deviation F is defined as a difference between measured and thus correct Doppler velocity components $v_{Doppler}$ and calculated radial velocity components $v_r$, $v_r'$ that are derived using equation (5) and/or equations (1) and (2). The deviation F indicates if targets are either stationary or not, and is expressed as:

$$F = v_{Doppler} - v_r' \quad (6)$$

and using equation (3) and equation (5), the following is expressed:

$$F = \cos(\varphi_d + \varphi_m) - \cos(\varphi_d + \varphi_m + \varphi_{error}) \quad (7)$$

A total correct detection angle $\varphi_{dT}$ with respect to the x-axis 7, when the misalignment error angle $\varphi_{err} = 0$, is defined as:

$$\varphi_{dT} = \varphi_d + \varphi_m \quad (8),$$

and a total misaligned detection angle $\varphi_{dT}'$ with respect to the x-axis 7 when the misalignment error angle $\varphi_{err} \neq 0$, is defined as:

$$\varphi_{dT}' = \varphi_d + \varphi_m + \varphi_{error} \quad (9).$$

Stationary targets which meet $F \cong 0$ (±several percent due to for example host velocity uncertainties) are always determined to be stationary, even if the sensor 3 is misaligned. In order to reduce the number of stationary detections for misaligned sensors, an angular cut value (pew is used where only detections with $|\varphi_{dT}| > \varphi_{cut}$ are considered when determining whether a sensor is misaligned or not.

Figure 2:
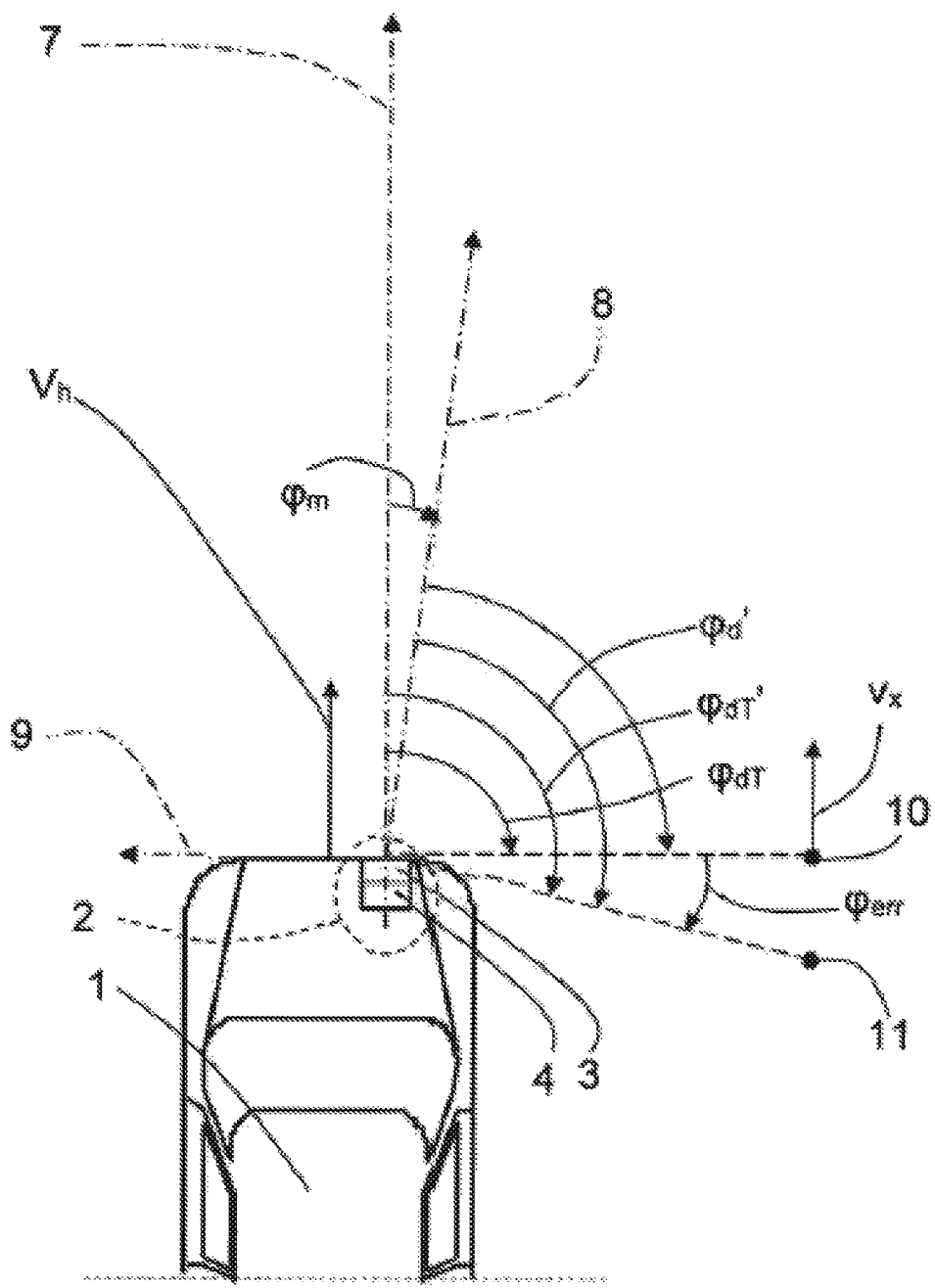
FIG. 2 shows a schematic top view of a vehicle with a radar system according to a second example embodiment.

In the following, a second example for examining the alignment status with reference to FIG. 2 will be described. Here there is a real object 10 and a false object 11, where the false object 11 differs from the real object 10 when a misalignment error angle $\varphi_{err} \neq 0$.

In the second example, a detection is analyzed when the detected radial velocity equals zero, since a radial velocity that equals zero corresponds to a total correct detection angle $\varphi_{dT}$ with respect to the x-axis 7 according to equation (8) that equals 90° if the misalignment error angle $\varphi_{err}$ equals zero. This follows from equation (3) since $\cos(\varphi_d + \varphi_m) = \cos \varphi_{dT} = \cos 90° = 0$. The object 10 may have a velocity x-component $v_x$, i.e. be moving parallel to the host vehicle 1, or be completely stationary. Irrespective of whether the object 10 is completely stationary or only is moving parallel to the host vehicle 1, it will be classified as stationary for a total correct detection angle $\varphi_{dT}$ of 90°.

For a misaligned sensor there is a total misaligned detection angle $\varphi_{dT}'$ with respect to the x-axis 7 according to equation (9). This implies that targets which are determined to be located at 90° are in reality shifted by the misalignment error angle $\varphi_{err}$, and detections at a total misaligned detection angle $\varphi_{dT}' = 90°$ are now classified as moving.

The different behavior of aligned and misaligned sensors in the above context can be expressed by a percentage fraction in the same way as in the first example.

Furthermore, when a misalignment has occurred and has been detected, the total detected angle $\varphi_{dT}$ which contains most stationary targets can be used to determine the misalignment error angle $\varphi_{err}$ such that the misalignment can be compensated for.

According to some aspects of the present invention, in order to obtain even more data regarding whether a radar sensor is misaligned or not, the first example and the second example are combined.

Figure 3:
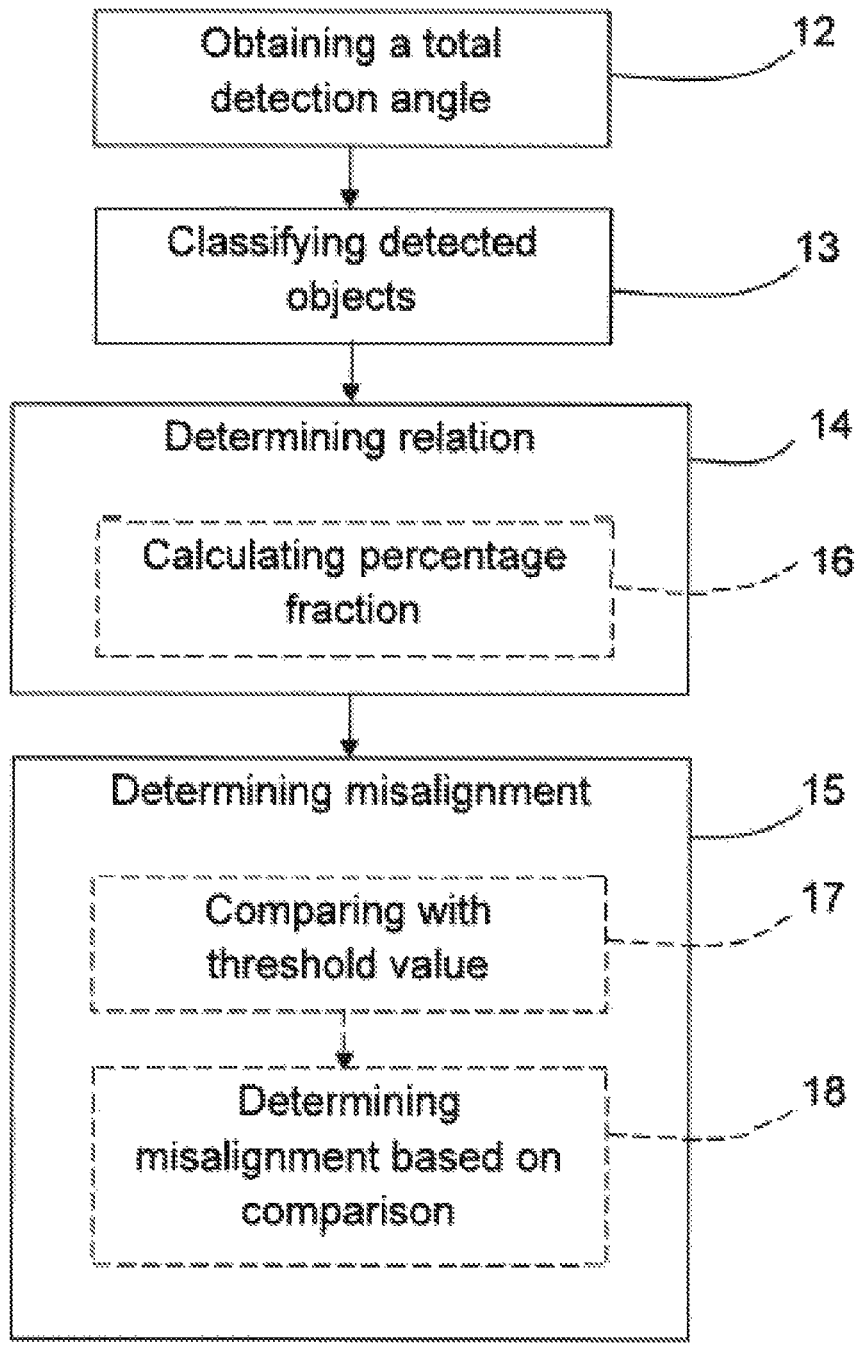
FIG. 3 shows a flowchart for methods according to the present disclosure.

With reference to FIG. 3, the present disclosure also relates to a method for estimating misalignment err of a vehicle radar detector 3 in a vehicle radar system 2 that is used for detecting a plurality of objects outside a vehicle 1, where the method includes steps of:

Step 12: Obtaining at least one total detection angle $\varphi_{dT}$, $\varphi_{dT}'$ relative an x-axis 7 and detecting at least one corresponding target Doppler velocity $v_{Doppler}$ relative the radar detector 3 for each detected object 5, 6; 10, 11 during a certain time interval.

Step 13: Classifying each detected objects as moving or stationary relative the surrounding environment.

Step 14: Determining a relation between the number of detections that has been classified as stationary and the total number of detections.

Step 15: Determining whether the radar detector (3) is misaligned based on said relation.

According to some further aspects of the present invention, the method includes the steps of:

Step 16: Calculating a percentage fraction by dividing the number of detections that has been classified as stationary with the total number of detections.

Step 17: Comparing the percentage fraction with a threshold value.

Step 18: Determining that the radar detector 3 is misaligned when the percentage fraction falls below the threshold value.

The total detection angle $\varphi_{dT}$, $\varphi_{dT}'$ equals the sum of a known mounting angle $\varphi_m$ between the x-axis 7 and the radar detector's forward detection direction 8, and a detection angle $\varphi_d$, $\varphi_d'$.

The present disclosure is not limited to the examples above, but may vary freely within the scope of the appended claims. For example, the microwave parts of the radar system 2 are assumed to be of a previously known design, and the radar system 2 includes more parts than shown, for example a radar transmitter, a radar receiver and a receiving antenna array. The radar system 2 may furthermore comprise a number of other parts, and is for example connected to a warning and/or information device installed in the vehicle 1 in a previously known manner.

The calculations and determining procedures are performed by the processing unit 4, where the processing unit 4 should be regarded as a processing unit arrangement that is in the form of one unit or several units that either co-operate or handle different tasks more or less independently. In the case of several units, these may be placed adjacent to each other, or in a distributed manner.

All details given in the example are of course only given as an illustration of the present disclosure, and should not be regarded as limiting in any way.

In the present disclosure, the processing unit arrangement 4 is arranged to obtain values for a total detection angle $\varphi_{dT}$, $\varphi_{dT}'$ relative an x-axis 7 and detected target Doppler velocity $v_{Doppler}$ and derived radial velocity $v_r$, $v_r'$ relative the radar detector 3 for each detected object 5, 6; 10, 11 during a certain time interval. In case there is no misalignment, i.e. if the misalignment error angle $\varphi_{err}=0$, the total detection angle is the total correct detection angle $\varphi_{dT}$, and if there is a misalignment, i.e. if the misalignment error angle $\varphi_{err}>0$, the total detection angle is the total misaligned detection angle $\varphi_{dT}'$.

The mounting angle $\varphi_m$ can of course equal zero, or have a negative value.

In this context, expressions such that there is no misalignment, that the misalignment error angle $\varphi_{err}$ equals zero and that the total detection angle $\varphi_{dT}$, $\varphi_{dT}'$ equals 90° should not be regarded as mathematically exact, but within a certain margin of error due to for example host velocity uncertainties and other possible error sources.

According to some aspects, such a margin of error falls below 5-10%.

It has been described that a percentage fraction is calculated by dividing the number of detections that has been classified as stationary with the total number of detections. Generally, a comparison is performed such that a relation between the number of detections that has been classified as stationary and the total number of detections is determined. Based on this relation it is determined whether the radar detector 3 is misaligned.

The radar detector 3 may be mounted in any manner and may have any kind of working. Generally, the radar detector's forward detection direction 8 is constituted by a mounting direction 8.

In this context, the terms moving and stationary relate to the surrounding environment; i.e. a motionless reference coordinate system outside the vehicle. In the first example, a detected object has a certain detected velocity $v_{Doppler} \neq 0$ relative the radar system 2 when it is classified as either moving or stationary. In the second example, a detected object is stationary relative the radar system 2, i.e. the detected velocity $v_{Doppler}=0$, when the detected object is classified as stationary.

Generally, the present disclosure relates to a vehicle radar system 2 arranged to detect a plurality of objects outside a vehicle 1, the radar system 2 including a radar detector 3 and a processing unit arrangement 4, the processing unit arrangement 4 being arranged to obtain at least one total detection angle $\varphi_{dT}$, $\varphi_{dT}'$ relative an x-axis 7 and at least one corresponding detected target Doppler velocity $v_{Doppler}$ relative the radar detector 3 for each detected object 5, 6; 10, 11 during a certain time interval. The processing unit arrangement 4 is adapted to classify each detected object as moving or stationary relative the surrounding environment, and to determine a relation between the number of detections that has been classified as stationary and the total number of detections, where the processing unit arrangement 4 further is adapted to determine whether the radar detector 3 is misaligned based on the relationship, where the total detection angle $\varphi_{dT}$, $\varphi_{dT}'$ equals the sum of a known mounting angle $\varphi_m$ between the x-axis 7 and the radar detector's mounting direction 8, and a detection angle $\varphi_d$, $\varphi_d'$.

According to an example embodiment, the processing unit arrangement 4 is adapted to calculate a percentage fraction by dividing the number of detections that has been classified as stationary with the total number of detections, where the processing unit arrangement 4 further is adapted to compare the percentage fraction with a threshold value, and to determine that the radar detector 3 is misaligned when the percentage fraction falls below the threshold value.

According to an example embodiment, the processing unit arrangement 4 is adapted to classify detected objects as moving or stationary objects relative the surrounding environment by determining if the detected target Doppler velocity $v_{Doppler}$ equals a calculated radial velocity $v_r$, $v_r'$, and if that is the case to classify a detected object as stationary, where the processing unit arrangement 4 is adapted to calculate the calculated radial velocity $v_r$, $v_r'$ as cosine for the total detection angle $\varphi_{dT}$, $\varphi_{dT}'$ times a negative host vehicle velocity $v_h$.

According to an example embodiment, the processing unit arrangement 4 is adapted to classify detected objects as moving or stationary objects relative the surrounding environment by determining whether the detected target Doppler velocity $v_{Doppler}$ equals zero for a total detection angle $\varphi_{dT}$, $\varphi_{dT}'$ that equals 90° and if that is the case to classify a detected object as stationary.

According to an example embodiment, the processing unit arrangement 4 is adapted to compare the percentage fraction with the threshold value based on accumulated results of a certain number of radar cycles, where each radar cycle is one observation phase in which the radar acquires data, processes the data on several signal processing levels and sends out available results.

According to an example embodiment, the processing unit arrangement 4 is adapted to compare the percentage fraction with the threshold value for different host velocity windows.

According to an example embodiment, the processing unit arrangement 4 is adapted to only consider detections having a total detection angle $\varphi_{dT}$, $\varphi_{dT}'$ that have an absolute value that exceeds a predetermined angular cut value $\varphi_{cut}$.

According to an example embodiment, the processing unit arrangement 4 is adapted to deactivate at least one safety function and/or to send an error message to a driver if the radar detector 3 is determined to be misaligned.

Generally, the present disclosure also relates to a method for estimating misalignment $\varphi_{err}$ of a vehicle radar detector 3 in a vehicle radar system 2 that is used for detecting a plurality of objects outside a vehicle 1, where the method includes the steps of:

Step 12: obtaining at least one total detection angle $\varphi_{dT}$, $\varphi_{dT}'$ relative an x-axis 7 and at least one corresponding detected target Doppler velocity $v_{Doppler}$ relative the radar detector 3 for each detected object 5, 6; 10, 11 during a certain time interval;

Step 13: classifying each detected object as moving or stationary relative the surrounding environment;

Step 14: determining a relation between the number of detections that has been classified as stationary and the total number of detections; and Step 15: determining whether the radar detector 3 is misaligned based on said relation, where the total detection angle $\varphi_{dT}$, $\varphi_{dT}'$ equals the sum of a known mounting angle $\varphi_m$ between the x-axis 7 and the radar detector's mounting direction 8, and a detection angle $\varphi_d$, $\varphi_d'$.

According to an example, the method includes the steps of:

Step 16: calculating a percentage fraction by comparing the number of detections that has been classified as stationary with the total number of detections;

Step 17: comparing the percentage fraction with a threshold value; and

Step 18: determining that the radar detector 3 is misaligned when the percentage fraction falls below the threshold value.

According to an example embodiment, the method includes classifying detected objects as moving or stationary objects relative the surrounding environment by determining if the detected target Doppler velocity $v_{Doppler}$ equals cosine for the total detection angle $\varphi_{dT}$, $\varphi_{dT}'$ times a negative host vehicle velocity $v_h$, and if that is the case classifying a detected object as stationary.

According to an example embodiment, the method includes classifying detected objects as moving or stationary objects relative the radar system 2 by determining whether the detected target Doppler velocity $v_{Doppler}$ equals zero for a total detection angle $\varphi_{dT}$, $\varphi_{dT}'$ that equals 90°, and if that is the case classifying a detected object as stationary.

According to an example embodiment, the method includes comparing the percentage fraction with the threshold value based on accumulated results of a certain number of radar cycles, where each radar cycle is one observation phase in which the radar acquires data, processes the date on several signal processing levels and sends out available results.

According to an example embodiment, the method includes comparing the percentage fraction with the threshold value for different host velocity windows.

According to an example embodiment, the method includes only considering detections having a total detection angle $\varphi_{dT}$, $\varphi_{dT}'$ that have an absolute value that exceeds a predetermined angular cut value $\varphi_{cut}$.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system arranged to detect a plurality of objects outside a vehicle, the radar system comprising; a radar detector and a processing unit arrangement, the processing unit arrangement being arranged to obtain a total detection angle relative an x-axis and at least one corresponding detected target Doppler velocity relative to the radar detector for the plurality of objects during a certain time interval, the processing unit arrangement is adapted to classify the plurality of objects as one of a moving object or a stationary object relative a surrounding environment, and to determine a relation between a number of the plurality of objects that has been classified as one of the stationary object and a total number of detections, where the processing unit arrangement further is adapted to determine whether the radar detector is misaligned based on the relation, where a total detection angle equals the sum of a known mounting angle between the x-axis and a mounting direction of the radar detector, and a correct or a misaligned detection angle.

2. A vehicle radar system according to claim 1 further comprising, the processing unit arrangement is adapted to calculate a percentage fraction by dividing the number of the plurality of objects that has been classified as one of the stationary object with the total number of detections, where the processing unit arrangement further is adapted to compare the percentage fraction with a threshold value, and to determine that the radar detector is misaligned when the percentage fraction falls below the threshold value.

3. A vehicle radar system according to claim 2 further comprising, the processing unit arrangement is adapted to compare the percentage fraction with the threshold value based on accumulated results of a certain number of radar cycles, where each of the radar cycles is one observation phase in which the radar detector acquires data, processes the data on several signal processing levels and sends out available results.

4. A vehicle radar system according to claim 2 further comprising, the processing unit arrangement is adapted to compare the percentage fraction with the threshold value for one or more different host vehicle velocity windows.

5. A vehicle radar system according to claim 1 further comprising, the processing unit arrangement is adapted to classify the plurality of objects as one of the moving object or one of the stationary object relative to the surrounding environment by determining if the detected target Doppler velocity equals a calculated radial velocity and if that is the case, to classify the plurality of objects as one of the stationary object, where the processing unit arrangement is adapted to calculate a calculated radial velocity as a cosine for the total detection angle times a negative host vehicle velocity.

6. A vehicle radar system according to claim 1 further comprising, the processing unit arrangement is adapted to classify the plurality of objects as one of the moving object or one of the stationary object relative to the surrounding environment by determining whether the detected target Doppler velocity equals zero for the total detection angle that equals 90° and if that is the case, to classify the object as one of the stationary object.

7. A vehicle radar system according to claim 1 further comprising, the processing unit arrangement is adapted to only consider a detection of the plurality of objects having the total detection angle that have an absolute value that exceeds a predetermined angular cut value.

8. A vehicle radar system according to claim 1 further comprising, the processing unit arrangement is adapted to deactivate at least one safety function or to send an error message to a driver of the vehicle if the radar detector is determined to be misaligned.

9. A method for estimating a misalignment of a vehicle radar detector in a vehicle radar system that is used for detecting a plurality of objects outside a vehicle, where the method comprises the steps of;
  obtaining at least one total detection angle relative an x-axis and at least one corresponding detected target Doppler velocity relative to the radar detector for detected objects of the plurality of objects during a certain time interval;
  classifying the plurality of objects as one of a moving object or a stationary object relative a surrounding environment;
  determining a relation between a number of the plurality of objects that has been classified as one of the stationary object and a total number of detections; and
  determining whether the radar detector is misaligned based on the relation,
  where a total detection angle equals the sum of a known mounting angle between the x-axis and a mounting direction of the radar detector, and a correct or misaligned detection angle.

10. The method according to claim 9 wherein the method further comprises the steps of:
  calculating a percentage fraction by comparing a number of the plurality of objects that has been classified as one of the stationary object with the total number of detections;
  comparing the percentage fraction with a threshold value; and
  determining that the radar detector is misaligned when the percentage fraction falls below the threshold value.

11. The method according to claim 10 further comprising; the steps of comparing the percentage fraction with the threshold value based on an accumulated result of a certain number of radar cycles, where each of the radar cycles is one observation phase in which the radar detector acquires data, processes the data on several signal processing levels and sends out available results.

12. The method according to claim 10 further comprising, the steps of comparing the percentage fraction with the threshold value for different host velocity windows.

13. The method according to claim 9 further comprising; classifying the of plurality objects as one of the moving objects or one of the stationary object relative to the surrounding environment by determining if the detected target Doppler velocity equals a cosine for the total detection angle times a negative host vehicle velocity, and if that is the case, classifying the detected object as one of the stationary object.

14. The method according to claim 9 further comprising, the steps of classifying the plurality of objects as one of the moving object or one of the stationary object relative to the radar system by determining whether the detected target Doppler velocity equals zero for the total detection angle that equals 90°, and if that is the case, classifying the plurality of objects as one of the stationary object.

15. The method according to claim 9 further comprising, the steps of only considering a detection of the plurality of objects having the total detection angle that has an absolute value that exceeds a predetermined angular cut value.

* * * * *